United States Patent Office 3,678,005
Patented July 18, 1972

3,678,005
MIXED IMIDE-ISOINDOLOQUINAZOLINEDIONES HETEROCYCLIC POLYMERS
Guy Rabilloud, Bernard Sillion, and Gabriel de Gaudemaris, Grenoble, France, assignors to Institut Francais du Petrole des Carburants et Lubrifiants, Rueil-Malmaison, France
No Drawing. Filed Apr. 14, 1970, Ser. No. 28,526
Claims priority, application France, Apr. 18, 1969,
12,375
Int. Cl. C08g 20/32
U.S. Cl. 260—47 CP          18 Claims

ABSTRACT OF THE DISCLOSURE

Heat-resistant, as well as tough polymers are provided consisting essentially of recurring units of at least one of the following formulae:

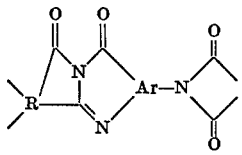

and

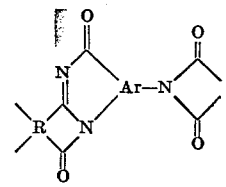

wherein Ar is selected from homocyclic and heterocyclic trivalent aromatic radicals, the three valences of which are linked to different carbon atoms, two of said valencies being linked to adjacent carbon atoms, and R is a tetravalent organic radical containing at least two carbon atoms. Precursors and processes to porduce these polymers are also described.

---

This invention relates to new thermally stable heterocyclic polymers, to precursor polymers of these heterocyclic polymers and to the manufacture and use of such polymers.

More particularly this invention has for objects:

poly-acid-amide precursors of these heterocyclic polymers
poly-ester-amide precursors of these heterocyclic polymers
proceses for manufacturing these various polymers
the use of these polymers, particularly for the manufacture of shaped articles, films, filaments, foams, cellular structures, adhesives, molded or fritted articles, composite materials varnishes and lining and coating compositions.

The new thermostable polymers according to this invention both exhibit the resistance to heat of the poly-isoindoloquinazolinediones and the stretching power, the toughness and the resistance to scaling of certain polyimides.

They are characterized by recurring units of the general formula:

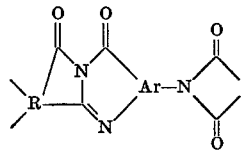

and/or

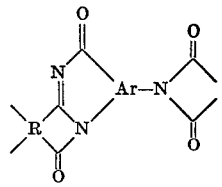

wherein Ar is a trivalent aromatic, homocyclic or heterocyclic radical, whose three valences are linked to different carbon atoms, two of these valences being obligatorily on adjacent carbon atoms, i.e. in ortho or peri position with respect to each other. The radical Ar is formed of one or more (e.g. 2 to 6) fused or linked rings, each of which preferably contains 5 to 7 carbon atoms partially substitutable with oxygen, sulfur and nitrogen atoms. Preferably the radical Ar contains 6 to 24 carbon atoms when homocyclic and 3 to 24 carbon atoms and 1 to 6 atoms of oxygen, sulfur and/or nitrogen when heterocyclic.

When radicals Ar comprise several interlinked rings, the linking members will be, for example, a direct bond or one of the following groups:

$-O-$; $-S-$; $-SO-$; $-SO_2-$; $-CO-$; $-CHOR_1$; $-CF_2-$ $-NR_1-$; $-COO-$; $-\left(\underset{R_2}{\overset{R_1}{\underset{|}{\overset{|}{C}}}}\right)_n-$; $-\underset{R_4}{\overset{R_3}{\underset{|}{\overset{|}{Si}}}}-$; $-O-\underset{R_4}{\overset{R_3}{\underset{|}{\overset{|}{Si}}}}-O-$; $-\underset{O}{\overset{R_3}{\underset{\|}{\overset{|}{P}}}}-$ $-O-\underset{O}{\overset{R_3}{\underset{\|}{\overset{|}{P}}}}-O-$; $-\underset{CF_3}{\overset{CF_3}{\underset{|}{\overset{|}{C}}}}-$; $-N=N-$; $-N=N-$;

$-CO-NR_1-$; $-R_1N-CO-NR_2$; $-CO-O-Y-O-CO-$
$-O-CO-Y-CO-O$; $-CO-R_1N-Y-NR_2-CO-$
$-R_1N-CO-Y-CO-NR_2-$ $R_1$ and $R_2$ being hydrogen atoms or monovalent hydrocarbon groups, e.g. alkyl, cycloalkyl or aryl groups, $R_3$ and $R_4$ being monovalent hydrocarbon groups, e.g. alkyl, cycloalkyl or aryl groups, Y being a linear or branched alkylene radical preferably having 1 to 12 carbon atoms, a cycloalkylene radical containing 5 to 12 carbon atoms, 5 or 6 carbon atoms of which being in the ring, or a mono or polycyclic arylene radical containing preferably 5 to 20 carbon atoms, and $n$ being an integer preferably from 1 to 6. Radicals $R_1$ to $R_4$ each preferably contains from 1 to 20 carbon atoms, R is an organic tetravalent radical having at least two carbon atoms, preferably 2 to 24. More particularly R may be, for example, a linear or branched saturated aliphatic radical having 2 to 4 carbon atoms, an alicyclic saturated radical with 5 to 6 carbon atoms in the ring or an aromatic homocyclic or heterocyclic radical. When an aromatic radical, R has two groups of two valencies in ortho or peri position. It may consist of one or more (e.g. 2 to 6) fused or linked cycles each having preferably 5 to 7 carbon atoms which can be optionally replaced with oxygen, sulfur and/or nitrogen atoms. Preferably the radical R contains 6 to 24 carbon atoms when aromatic homocyclic and 4 to 24 carbon atoms, 1 to 6 oxygen, sulfur and/or nitrogen atoms when heterocyclic. When radicals R contain several interlinked cycles, the linking members are, for example, a direct bond or any of the above-mentioned groups for radicals Ar.

The thermostable heterocyclic polymers such as hereabove described can be prepared, according to this invention, by processes consisting, for example, of reacting at least one aromatic diaminodiamide (or one of its salts of addition with an acid) of the formula:

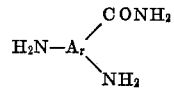

wherein Ar is a trivalent aromatic radical as hereabove defined, with a tetracarboxylic compound selected from:

(a) Tetraesters of tetracarboxylic acids of the general formula:

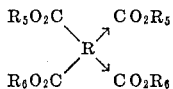

wherein R is a tetravalent organic radical as hereabove defined, $R_5$ and $R_6$ are hydrocarbon monovalent radicals, each preferably containing from 1 to 13 carbon atoms (e.g. lower alkyl radicals containing 1 to 13 carbon atoms, cycloalkyl or aryl radicals containing 6 to 13 carbon atoms) the arrow being indicative of an isomerism when R is a cyclic radical.

(b) The dihaloformylesters of the general formula:

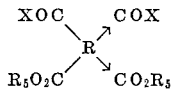

wherein R is a tetravalent organic radical as hereabove defined, $R_5$ is as hereabove defined, X is a halogen atom, preferably chlorine or bromine, the arrows indicating an isomerism when R is a cyclic radical.

(c) The diesters-diacids of the general formula:

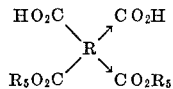

wherein R and $R_5$ are the same as hereabove and the arrows indicate an isomerism when R is a cyclic radical.

(d) The dianhydrides of tetracarboxylic acids of the general formula:

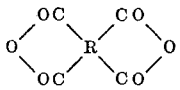

wherein R is defined as hereabove.

(e) Carboxylic tetraacids of the general formula:

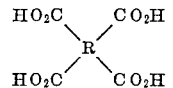

wherein R is defined as hereabove.

According to these processes there are obtained directly the heterocyclic polymers of the invention or various compositions which are thereafter converted to heterocyclic polymers of the invention under the conditions hereinafter defined.

The reaction temperatures depend on the specific reactivity of each reactant, they are generally between 0 and 500° C., even in some cases lower than 0° C.

The reactants are preferably used in equimolecular proportions, although still satisfactory results are sometimes achievable with different proportions. It is however advisable to avoid an excess of one of the reactants of more than 10 to 50%, which is a maximum.

The aromatic diaminoamides used according to the invention contain two amine groups and one carbonamides group linked to separate carbon atoms of the aromatic radical, but one of these amine groups is necessarily linked to a carbon atom adjacent to that which carries the carbonamide group, i.e. in ortho or peri position. The preferred diaminoamides are those in which the carbonamide group and one of the amine groups are in ortho position with respect to each other. The trivalent aromatic group designated by Ar in the formula of the diaminoamide, may be substituted with an alkyl, cycloalkyl, aryl, alkoxy or aryloxy radical having preferably from 1 to 12 carbon atoms or with one or more halogen atoms.

As diaminoamides which can be used for the preparation of the polymers and prepolymers of this invention, there can be mentioned, by way of example:

2,4-diaminobenzamide,
2,5-diaminobenzamide,
2,6-diaminobenzamide,
5,8-diamino-1-carbamoyl naphthalene,
6,8-diamino-1-carbamoyl naphthalene,
2,8-diamino-1-carbamoyl naphthalene,
2,5-diamino-3-carbamoyl naphthalene,
3,5-diamino-2-carbamoyl naphthalene,
3,9-diamino-10-carbamoyl anthracene,
3,10-diamino-9-carbamoyl anthracene,
3,6-diamino-2,4,5-trimethyl benzamide,
2,5-diamino-4-methyl benzamide,
2,4-diamino-5-methoxy benzamide,
1,3-diamino-2-carbamoyl naphthalene,
1,4-diamino-2-carbamoyl naphthalene,
5,7-diamino-6-carbamoyl-1-methyl naphthalene,
1,3-diamino-2-carbamoyl-6-methyl naphthalene,
2,5-diamino-3-carbamoyl pyridine,
2,5-diamino-3-carbamoyl pyrazine,
3,5-diamino-2-carbamoyl pyrazine,
4-para-aminobenzoyl anthranilamide,
5-meta aminobenzoyl anthranilamide,
4-para-aminophenoxy anthranilamide,
5-aminophenoxy anthranilamide,
4,4'-diamino-3-carbamoyl diphenylmethane,
3,4'-diamino-4-carbamoyl diphenylmethane,
3,3'-diamino-4-carbamoyl diphenylmethane,
4,3'-diamino-3-carbamoyl diphenylmethane,
4,4'-diamino-3-carbamoyl benzhydrol,
3,4'-diamino-4-carbamoyl-benzhydrol,
3,3'-diamino-4-carbamoyl benzhydrol,
4,3'-diamino-3-carbamoyl-3-benzhydrol,
3,4' (and 4,4') diamino 3'-carbamoyl benzanilides,
3,3' (and 4,3') diamino-4'-carbamoyl benzanilides,
4,4'-diamino-3-carbamoyl diphenylsulfide,
4,4'-diamino-3-carbamoyl diphenylsulfone,
4,4'-diamino-3-carbamoyl diphenylsulfoxide,
4,4'-diamino-3-carbamoyl diphenyl,
4,4'-diamino-3-carbamoyl-3'-methyl diphenyl,
4,4'-diamino-3-carbamoyl diphenyldisulfide,
4,4'-diamino-3-carbamoyl diphenyldifluoromethane,
4,4'-diamino-3-carbamoyl diphenylamine,
m-aminophenyl 3-amino-4-carbamoyl benzoate,
N-m-aminophenyl-N-(4-amino-3-carbamoyl phenyl)urea,
2-m-aminophenyl-5-(3-amino-4-carbamoyl)-1,3,4-oxadiazole,
2-p-aminophenyl-5-(3-amino-4-carbamoyl)-1,3,4-thiadiazole,
2-amino-4-m-aminobenzoylhydrazinocarbonyl benzamide,
4'-para-aminobenzoyl-4-phenoxy anthranilamide,
4'-meta-aminobenzoyl-5-benzoyl anthranilamide,
4'-meta-aminophenoxy-4-benzoyl anthranilamide,
1,4-diamino-2-carbamoyl anthraquinone,
3,3' (and 3,4')-diamino-4-carbamoyl benzanilides.

As examples of tetracarboxylic compounds which can be used according to this invention, there are to be mentioned the dianhydrides of the following acids:

pyromellitic acid,
3-phenyl pyromellitic acid,
3,6-diphenyl pyromellitic acid,
3-benzoyl pyromellitic acid,
3,6-dibenzoyl pyromellitic acid,
3-trifluoromethyl pyromellitic acid,
1,2,5,6-tetracarboxy naphthalene,
2,3,6,7-tetracarboxy naphthalene,
1,2,4,5-tetracarboxy naphthalene,
1,4,5,8-tetracarboxy naphthalene,
1,4,5,8-tetracarboxy tetrahydronaphthalene,
1,4,5,8-tetracarboxy-2,6-dichloronaphthalene,
1,2,3,4-tetracarboxy benzene,
3,3',4,4'-tetracarboxy diphenyl,
2,2',3,3'-tetracarboxy diphenyl,
3,4,9,10-tetracarboxy perylene, 2,2-bis-(3,4-dicarboxy phenyl) propane,
2,2-bis-(2,3-dicarboxy phenyl) propane,
1,1-bis-(2,3-dicarboxy phenyl) ethane,
1,1-bis-(3,4-dicarboxy phenyl) ethane,
bis-(2,3-dicarboxy phenyl) methane,
bis-(3,4-dicarboxyphenyl) methane,
bis-(3,4-dicarboxy phenyl)ether,
bis-(3,4-dicarboxyphenyl) sulfide,
bis-(3,4-dicarboxy phenyl) sulfone,
2,2',3,3'-tetracarboxybenzophenone,
2,3,3',4'-tetracarboxybenzophenone,
3,3',4,4'-tetracarboxybenzophenone,
3,3',4,4'-tetracarboxybenzhydrol,
1,8,9,10-tetracarboxyphenanthrene,
2,3,5,6-tetracarboxypyrazine,
2,3,4,5-tetracarboxythiophene,
ethylene tetracarboxylic acid,
2,3,4,5-tetracarboxypyrrolidine,
cyclopentane-1,2,3,4-tetracarboxylic acid,
butane tetracarboxylic acid,
3,3',4,4'-tetracarboxyazobenzene,
3,3',4,4'-tetracarboxyazoxybenzene,
ethylene bis-trimellitate,
N,N'-bis-(3,4-carboxybenzoyl)-N,N'-diphenyl-p-phenyl-
  enediamine,
1,4-dimethyl-7,8-diphenyl-(2,2,2)-bicyclo-7-octene-
  2,3,5,6-tetracarboxylic acid,
1,4,7,8-tetrachloro-(2,2,2)-bicyclo-7-octene-2,3,5,6-tetra-
  carboxylic acid,
7,8-diphenyl-(2,2,2)-bicyclo-7-octene-2,3,5,6-tetracar-
  boxylic acid,
1,8-dimethyl-(2,2,2)-bicyclo-7-octene-2,3,5,6-tetracar-
  boxylic acid,
p-phenylene bis-trimellitate,
neopentyl-bis-trimellitate,
2,2-bis-(3,4-dicarboxyphenyl) hexafluoropropane,
1,3-bis-(3,4-dicarboxybenzoyl)-benzene,
bis-(3,4-dicarboxy-1,4-benzoyl)benzene,
4,4'-bis-(3,4-dicarboxybenzoyl)diphenylether,
1,3-bis-(3,4-dicarboxybenzyl)benzene,
4,4'-bis-(3,4-dicarboxybenzyl)diphenylether,
1,3-bis-(3,4-dicarboxyphenylhydroxymethylene)benzene,
bis-(3,4-dicarboxyphenyl)diphenylsilane,
3,3',4,4'-tetracarboxybenzanilide,
bis-(3,4-dicarboxyphenyl)difluoromethane,
bis-(3,4-dicarboxyphenoxy)dimethylsilane,
N-N'-bis-(3,4-dicarboxyphenyl)urea,
N,N'-bis-(3-dicarboxyphenyl)thiourea,
bis-(3,4-dicarboxyphenyl)isophthalate,
N,N'-bis-(3,4-dicarboxyphenyl)isophthalamide,
N,N'-bis-(3,4-dicarboxyphenyl)terephthalamide,
4,4'-bis-(N-3,4-dicarboxyphenylcarbamoyl)diphenylether,
1,3-bis-(3,4-dicarboxyphenoxy)benzene,
1,4-bis-(3,4-dicarboxyphenoxy)benzene,
nadic acid,
tetrahydrofuran,
2,3,4,5-tetracarboxylic acid There will also be mentioned the tetracids themselves, the alkyl and aryl diacid diesters, the alkyl and aryl tetraesters, the alkyl and aryl di-haloformyl diesters, the esters being for example the methyl, ethyl, isopropyl, n-butyl, tert-butyl, neopentyl, n-dodecyl, phenyl, m-tolyl, o-tolyl, p-tolyl and xylyl esters derived from the preceding anhydrides and acids.

According to the kind of carboxylic compounds which are used the polymers of the invention or the prepolymers precursors of these polymers, are prepared according to various processes which are included in the scope of the present invention.

(1) According to the process of the invention heterocyclic polymers are prepared by reacting at least one aromaic diaminoamide with at least one tetraester of a tetracarboxylic acid having the formula:

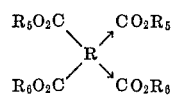

wherein R, $R_5$ and $R_6$ have the same definition as hereabove.

These tetraesters can be prepared according to conventional methods and may be perfectly symmetric ($R_5=R_6$) as, for example the methyl tetraesters, the ethyl tetraesters, the phenyl tetraesters, or, on the contrary, they can be mixed esters such as the methyl diesters-ethyl diesters or the ethyl diesters-phenyl diesters.

In the preferred embodiment of the invention it is suitable to effect the polymerization on non-adjacent esters groups so as to obtain essentially linear heterocyclic polymers. This reaction is favored by the use of mixed esters such as, for example alkyl diesters-aryl diesters.

The polycondensation reaction is carried out either by admixing the reactants to one another, or by dissolving them in a convenient organic solvent, such as, for example:

dimethylformamide,
diethylformamide,
dimethylacetamide,
diethylacetamide,
N-methylpyrrolidone,
hexamethylphosphoramide,
pyridine,
N-methylcaprolactam,
N-acetylpyrrolidone,
dimethylsulfoxide,
dimethylsulfone,
butyrolactone,
tetramethylenesulfone,
tetramethylurea These solvents can be used alone or in admixture to one another or still in combination with other organic solvents which are poor solvents for the polymer such as, for example, benzene, toluene, xylenes, a naphtha solvent, dioxane, benzonitrile, acetone, cyclohexane, the mixture being heated up to a temperature between 100° C. and 500° C., preferably between 150° C. and 450° C. When the reaction temperature is selected low enough, preferably between 150° C. and 300° C., there is formed a polymer containing mainly recurring units of the formula:

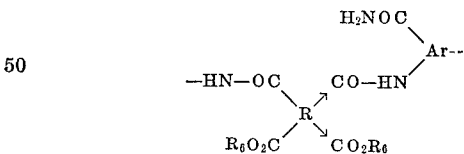

wherein Ar, R and $R_6$ are defined as hereabove.

These polymers have relatively low molecular weights and their inherent viscosity, measured at 30° C. for a concentration of 0.5% by weight in N-methylpyrrolidone is lower than 0.4 dl./g.; it is generally between 0.05 dl./g. and 0.25 dl./g. These small intermediary polymers or prepolymers are fusible, their melting temperature being generally lower than 300° C., and soluble in a number of organic solvents.

These polymers containing amide-esters units may be shaped, admixed with fillers, used as lining or coating compositions and converted to the heterocyclic polymers of the invention by thermal treatment between 250° C. and 450° C., preferably between 260° C. and 400° C. During this treatment the polycondensation reaction continues and the obtained polymers are of a much higher molecular weight than the starting prepolymers.

(2) According to another embodiment of the present invention there is prepared a polyamide-ester precursor of the heterocyclic polymers of the invention by reacting at least one aromatic diamino-amide with at least one dihaloformyldiester derived from a tetracarboxylic acid and having the formula:

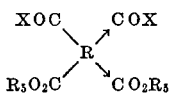

wherein X, R and $R_5$ have the above mentioned definition.

These dihaloformyldiester may be prepared according to conventional methods. One of the most convenient methods consists of reacting a dianhydride of a carboxylic tetra-acid with an alcohol so as to form the corresponding bis-o-carboxyester. The latter compound, treated with a halogenating agent such as a thionyl, phosphorus, phosphoryl or oxalyl halide, is converted to a dihaloformyldiester.

According to this specific embodiment of the process, the aromatic diaminoamide is dissolved in an organic solvent which is inert with respect to the used reactants, such as for example, one of the solvents mentioned in the description of the preceding embodiment.

The solution of diaminoamide is the selected solvent is maintained under inert atmosphere, the second reactant, i.e. the dihaloformyldiester is added thereto, either alone or in solution in an organic solvent which may be identical to or different from the solvent selected for the diaminoamide. When the solvents are different, it is preferable to select a system of solvents miscible with one another and which can dissolve the formed polymer.

The temperature of the polycondensation reaction may vary within large limits but it is preferably chosen lower than 150° C. In most cases the starting temperature is close to the room temperature, e.g. 0 to 20° C., and the condensation reaction being exothermic, the temperature increase can be reduced by adjusting the rate of addition of the second reactant to the first one and/or by efficient cooling of the reaction mixture. At the end of the reaction there is obtained an intermediary polyamide-ester containing units of the formula:

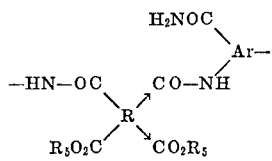

These polymers are of high molecular weights and their inherent viscosity is higher than 0.2 dl./g.; it is generally between 0.25 and 3 dl./g.

According to another specific embodiment of this process, an intermediary polyamide-ester is prepared by reacting an aromatic diaminoamide with the dihaloformyldiester according to the interfacial technique.

In order to carry out the interfacial polymerization there are admixed water, the aromatic diaminoamide or hydrochloride thereof and optionally an emulsifying agent. There is added thereafter a protons acceptor and the mixture is vigorously stirred. During this quick stirring there is added a solution of a dihaloformyldiester in an organic solvent inert with respect to the reactants and to the polymer. The mixture is stirred at high speed up to achievement of a complete polymerization. The reaction temperature is close to room temperature, e.g. 0 to 30° C., but it can be lower than 0° C. or higher than 30° C. The polymer is thereafter separated e.g. by filtration, washed and dried. The solvent of the acid dihalide is, for example, benzene, toluene, xylene, nitrobenzene, benzonitrile, tetrahydrofuran, cyclohexanone, methylene chloride.

The "protons acceptor" is a compound used for removal of the inorganic haloacid during the reaction. There is used, for example, sodium carbonate, calcium carbonate, sodium hydroxide, potassium hydroxide, triethyl amine, pyridine or any other conventional protons acceptor in reactions of the interfacial type.

The interfacial technique provides intermediary polyamide-esters of higher molecular weight, with an inherent viscosity generally higher that 0.2 dl./g., in most cases between 0.3 and 5 dl./g.

The intermediary polyamide-esters contain units having a formula identical to that given above for the polyamide-esters prepared during the reaction in solution.

The dry polyamide-ester obtained by this process is soluble in polar organic solvents used for preparing the polyamide-esters in solution.

The compositions of the polyamide-esters type are very stable and can be preserved without any degradation to be observed, in view of their later use, or used immediately for the preparation of articles having a specific shape. After transformation of the composition to a shaped article and after drying of said article, it is preferred to convert the polyamide-ester to a heterocyclic polymer of the invention by convenient thermal treatment. This treatment consists, for example, in a heating to a temperature of at least 125° C., preferably between 150° C. and 400° C. The higher the temperature, the more rapid is the conversion of the polyamide-ester to a heterocyclic polymer.

(3) According to still another embodiment of the present invention heterocyclic polymers are prepared by reacting at least one aromatic diaminoamide with at least one diester diacid of the formula:

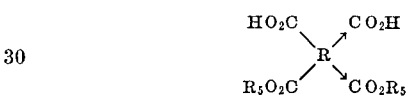

wherein R and $R_5$ are defined as hereabove.

The diester diacids may be prepared by conventional methods e.g. by reacting a dianhydride of tetracarboxylic acid with a monoalcohol such as methanol, ethanol, propanol, isopropanol, n-butanol, benzyl alcohol.

The diester diacid may be prepared directly in a solvent suitable for the object of the invention, or preliminarily separated. The polycondensation reaction between the diester diacid and the aromatic diaminoamide may be carried out by admixing substantially equimolecular amounts of each of the reactants and subjecting this intimate mixture to a convenient thermal treatment between 50° C. and 500° C., preferably between 100° C. and 400° C.

In another specific embodiment of this process there is prepared a resinous composition by dissolving in a suitable solvent the diester diacid and the aromatic diaminoamide. The composition can be used in this form in view of a determined application. It can also be heated to a moderate temperature, for example bettween 40° C. and 150° C., before use. The resinous composition may be transformed in an article of particular shape such as a filament, a film, a tube, a bulrush, a moulded article formed only thereof or having associated thereto other known polymeric substances or mineral or organic fillers. It can also be used as lining or coating composition for the manufacture of films, varnishes and stratified materials.

The shaped articles manufactured from the resinous composition are dried for removing the solvent and converted to the heterocyclic polymers of the invention by a suitable thermal treatment at a temperature preferably higher than 80° C. and advantageously between 120° C. and 400° C.

The solvents which can be used for preparing the solutions of monomers, are organic compounds inert with respect to these monomers. Amongst these solvents there can be mentioned alcohols such as: methanol, propanol, isopropanol, n-butanol, isobutanol, tertiobutanol, amyl alcohol, isoamyl alcohol, neopentyl alcohol, benzyl alcohol, isooctanol, lauryl alcohol; ketones such as: acetone, methylethylketone, diethylketone, methylisopropylketone, diisopropylketone, methylisobutylketone, 2,4 - pentanedione, cyclohexanone, phenylcyclohexanone, acetophenone; phenols such as: phenol, m-cresol, p-cresol, o-cresol, mixtures of cresols, xylenols, chlorophenols; high boiling hydrocarbons derived from petroleum, aromatic hydrocarbons such as: benzene, toluene, xylenes, naphtha solvent, ethylene glycol and diethylene glycol mono and diethers, ethylene glycol and diethylene glycol mono and diesters, dioxane, tetrahydrofuran, cyclohexane, aliphatic and aromatic esters of carboxylic aliphatic and aromatic acids such as ethyl acetate, methyl acetate, isopropyl acetate, phenyl acetate, phenyl propionate; ethers such as: butyl ether, tetrahydrofuran.

There can also be used solvents such as: benzonitrile, nitrobenzene, butyrolactone, butyrolactame, N-methylcaprolactame, chlorinated aromatic hydrocarbons, dimethylformamide, methylformamide, dimethylacetamide, formamide, dimethylsulfoxide, dimethylsulfone, tetramethlyurea, pyridine, quinoline, N-methylpyrrolidone, N-acetylpyrrolidone, hexamethylphosphoramide, tetramethylenesulfone, and according to the solubility of the monomers, water can be used in admixture with some of the hereabove mentioned solvents.

(4) According to another process of the invention the heterocyclic polymers are prepared by reacting at least one aromatic diaminoamide with at least one tetracarboxylic acid of formula:

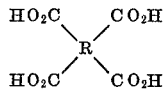

wherein R is defined as hereabove.

The polycondensation reaction between the tetra-acid and the aromatic diaminoamide may be carried out by admixing substantially equimolecular amounts of each of the reactants and subjecting the resulting mixture to a suitable thermal treatment between 50° C. and 500° C., preferably between 100° C. and 400° C.

In another preferred embodiment of this process a composition is prepared by dissolving both reactants in a convenient solvent. The solution can be used as such in certain determined applications. It can also be heated at moderate temperature, e.g. between 40° C. and 150° C., before use. The articles manufactured with the composition are dried for removing the solvent and converted to heterocyclic polymers of the invention by a suitable thermal treatment at a temperature generally higher than 80° C. and preferably between 120° C. and 400° C. The solvents which can be used in this process are the same as those mentioned above in relation with the case of diesters diacids.

(5) According to still another process of the invention the aromatic diaminoamide and a dianhydride of tetracarboxylic acid are admixed in an organic solvent capable of dissolving at least one of these reactants and inert with respect to both of them. The reaction temperature is usually between 0 and 200° C. There is thus formed a substantially linear polyamide-acid containing units of the general formula:

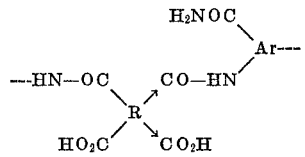

wherein R and Ar are defined as hereabove and the arrows represents an isomerism, when Ar is an alicyclic or aromatic radical.

In the preferred embodiment the polyamide-acid precursor of the heterocyclic polymer of the invention is prepared by dissolving the aromatic diaminoamide in the organic solvent, preferably under inert atmosphere and anhydrous conditions and by slowly adding thereafter the dianhydride so as to control the reaction temperature. The diaminoamide and the dianhydride can be admixed also in the form of dry solids, the resulting mixture being thereafter added by small portions and under stirring, to the organic solvent. The dianhydride can also be dissolved in the solvent and the diaminoamide slowly added thereto subsequently. The reaction being exothermic it is advantageous to control the additions of reactants so as to maintain the temperature below 80° C. and preferably between —20° C. and 60° C.

When preparing this intermediary polyamide-acid it is preferable to use substantially equimolecular amounts of the reactants so as to obtain high molecular weight polymers. There can be used however voluntarily an excess up to 5% of any one of the reactants, preferably the dianhydride. The molecular weight can also be controlled by adding known agents for the blocking of the chain as, for example, phthalic anhydride or aniline.

During the preparation of the intermediary polyamide-acid, it is advantageous that its molecular weight be high, which results in an inherent viscosity higher than 0.1 dl./g., preferably between 0.3 and 5 dl./g. The inherent viscosity is measured at 30° C. for a 0.5% by weight concentration of the polymer in a suitable solvent, preferably in dimethylacetamide.

There is no particular limit concerning the solvent amount to be used, provided the respective proportions of the solvents and the reacting substances form a good polymerization system. It has been observed as a general rule that, when the final mixture contains from 0.05 to 60% of solid components, an intermediary polymer of high molecular weight can be obtained.

The solvents which can be used in this polymerization process in solution are those which do not react with the starting compounds and which dissolve at least one of the reactants, preferably both of them. As solvent of this type there are preferably used dimethylformamide, dimethylacetamide, diethylacetamide, dimethylsulfoxide, N-methylpyrrolidone, N-methylcaprolactame, pyridine, dimethylsulfone, tetramethylurea, tetramethylenesulfone, hexamethylphosphoramide, N-acetyl-2-pyrrolidone, butyrolactone, N-methylformamide, quinoline. These solvents can be used separately or in combination with one another and also in combination with other organic solvents which are not generally solvents for intermediary polyamides-acids, such as for example benzene, toluene, xylene, naphtha solvents, nitrobenzenes, chlorobenzene, dioxane, acetone, cyclohexanone, cyclohexane.

(6) According to another process of the invention the aromatic diaminoamide can be reacted with the dianhydride of a tetracarboxylic acid in a water-containing organic solvent. The amount of water added to the organic solvent is generally between 0.5 and 10%. The temperature of the polycondensation reaction is preferably maintained below 40° C., in order to avoid undesirable reactions with water. According to this embodiment the polymerization reaction produces intermediary polyamide-acids of substantially high molecular weight, and the solution of the intermediary polymer in the mixture of solvents and water is well preserved, without gelification, whereas the solutions of polyamide-acids in anhydrous organic solvents tend to become gelified if kept over a long time.

The solvents to be used in this process are the same as hereabove mentioned.

(7) According to another process of the invention, polyamide-acids, precursors of the heterocyclic polymers of the invention, are prepared by reacting a solution of aromatic diaminoamide in an organic solvent capable of dissolving the intermediary poly-amide acid being manufactured, with a solution of the dianhydride of tetracarboxylic acid in a solvent which is a poor solvent for said polyamide-acid, but which can be admixed with the intermediary polymer.

As solvents for the polyamide-acid, there can be used, for example: N-methylpyrrolidone, dimethylformamide, dimethylacetamide, pyridine, dimethylsulfoxide, cresols, hexamethylphosphoramide. As solvents for the dianhydride of tetracarboxylic acid there are used organic compounds which do not dissolve the polyamide-acid but which are preferably miscible to the above-mentioned solvents. As compounds to be used for dissolving the dianhydride are to be mentioned aliphatic, alicyclic or aromatic ketones, such as acetone, methylethylketone, diethylketone, methyl propylketone, methylisopropylketone, cyclohexanone, acetophenone, benzophenone, lactones such as butyrolactone, valerolactone, esters such as dimethylphthalate, ethyl acetate, phenyl acetate, or ethers such as tetrahydrofuran.

In this process the solution of dianhydride is preferably added to the solution of diaminoamide, while stirring vigorously at room temperature. The formed polyamide-acid has generally a high molecular weight, its inherent viscosity being higher than 0.2 dl./g., preferably between 0.3 and 3 dl./g. According to the ratio between the two solvents the mixture of polymer and solvent is in the form of an organosol or of a solution.

(8) According to another process of the invention the reaction between the aromatic diaminoamide and the dianhydride of tetracarboxylic acid is carried out in a phenolic solvent containing a secondary or a tertiary amine. As phenolic solvent there is used phenol, m-cresol, o-cresol, p-cresol, industrial mixtures of cresols known as cresylic acids, xylenols, chlorophenols or chlorocresols. The phenolic solvent can be used alone or admixed with other phenolic solvents or combined with aromatic hydrocarbons such as for example: benzene, toluene, xylenes or the naphtha solvent.

Amongst the secondary of the tertiary amines which must be present with the phenolic solvent in the polymerization system, there can be mentioned, by way of example, di-n-butylamine, diisopropylamine, N-ethylaniline, dicyclohexylamine, 2,6-dimethyl piperidine, 3,5-dimethyl morpholine, pyridine, N,N-dimethylaniline, N.N-diethylaniline, triethylamine, tri-n-butylamine, quinoline, isoquinoline, N-methylpyrrolidine, N-ethylpiperidine, N-ethyl-morpholine.

In this process the secondary or tertiary amine is added to the phenolic solvent in a molar proportion of 0.5 to 5 with respect to the polymerizable reactants and the temperature of the reaction mixture is preferably maintained below 60° C. to 70° C.

In the same process there can be used phenolic solvents in admixture either with ammonium salts of monocarboxylic organic acids, such as, for example, ammonium acetate, ammonium propionate, ammonium benzoate, or with tertiary amines containing hydroxy or ester groups such as N-methyldiethanolamine, triethanolamine, N-methyldiethanolamine diacetate, N-acetoxy-isopropylmorpholine, N,N-methylphenylethanolamine.

According to another process applicable to water-soluble aromatic diaminoamides, the polymerization reaction is carried out in a solvent consisting of a mixture of water with a water-soluble tertiary amine such as, for example, pyridine, dimethylethanolamine or N,N,N',N'-tetramethylbutanediamine. The amount of tertiary amine can vary from 10 to 80% by weight with respect to the water amount but still satisfactory results are obtained when using for example equal amounts of water and tertiary amine.

According to another process, the heterocyclic polymers of the invention can be prepared by admixing the aromatic diaminoamide with the dianhydride of tetracarboxylic acid, and water or a mixture of water with ammonia. As many aromatic diaminoamides are very soluble in water, it is preferred first to dissolve the diamino-amide in water, under a current of inert gas so as to prevent oxidation reactions and finally to add the amount of ammonia required for dissolving the dianhydride. There is so obtained an homogeneous mixture, which, after evaporation of the water, can be converted to the heterocyclic polymer of the invention during a thermal treatment at a temperature between 100° C. and 400° C.

The conversion of the polyamide-acids as prepared according to the above-mentioned processes, to heterocyclic polymers of the invention, may be carried out in many different manners.

One of these processes consists of converting the intermediary polyamides-acids by heating at a temperature higher than 50° C. A heating at a moderate temperature, preferably between 50° C. and 150° C., mainly transforms the functional centers consisting of adjacent carboxylic acid and secondary amide groups to cyclic imides, thereby forming polymers containing a high number of units of the formula:

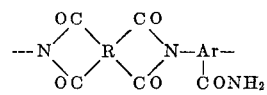

wherein R and Ar are defined as hereinabove.

A further heating at a higher temperature and preferably between 125° C. and 500° C. provides for the conversion of this intermediary polyimide-amide to the heterocyclic polymer of the invention.

Another process for converting polyamide-acids to heterocyclic polymers of the invention consists of heating the polyamide-acid either in solution in a non-reacting solvent in the presence of a tertiary amine, or in suspension in a non-reacting solvent in the presence of a tertiary amine or still in solution in a tertiary amine.

It can be assumed that the tertiary amine catalyses the cyclization reaction and makes it possible to carry out the conversion at a relatively low temperature, e.g. between 100° C. and 250° C.

Amongst the tertiary amines which can be used in this process, there can be mentioned as examples: pyridine, picolines lutidines, collidine, quinoline, quinaldine, isoquinoline, N,N-dimethylaniline, trimethylamine, triethylamine, N,N-dimethylbenzylamine, N,N-dimethyldodecylamine, and triethylenediamine.

Another process for converting the polyamide-acid to a heterocyclic polymer of the invention consists in a chemical treatment of the polyamide-acid with a dehydrating agent used alone or in combination with a tertiary amine. The dehydrating agent are anhydrides such as for example acetic anhydride, propionic, butyric, valeric, benzoic, naphthoic, toluic anhydrides, cetene and dimethylcetene.

The tertiary amines which can be used in the process are, for example: pyridine, quinoline, isoquinoline, picolines, lutidines, N,N-dimethyldodecylamine, trimethylamine, triethylamine, triethylenediamine, N-methylmorpholine.

Another conversion process, which is really a combined treatment, may be used for converting the polyamide-acids to the heterocyclic polymers of the invention. The polyamide-acid is partially converted to a polyimide-amide or to a heterocyclic polymer of the invention by a chemical conversion treatment, the cyclization being thereafter completed by a convenient thermal treatment at a temperature higher than 120° C. and preferably between 150° C. and 500° C.

In all the processes of preparation of the heterocyclic polymers of the invention or of polymers precursors thereof, or of prepolymers, there is reacted at least one aromatic diaminoamide with at least one derivative of a tetracarboxylic acid, but all the co-polymers prepared by reacting one or more aromatic diaminoamides with one or more tetracarboxylic compounds are intended to be within the scope of this invention.

In view of particular applications it may be convenient to cross-link the polymer by using compounds having more than two functional centers as, for example the aromatic triaminoamides, the monoamino-bis-O-aminoamides, the aromatic triamines, the trianhydrides of hexacarboxylic acids, the use of such compounds in small proportions being also within the cope of the invention.

In their final form, i.e. after complete cyclization, the heterocyclic polymers of the invention cannot be processed easily in view of their high melting point (generally higher than 500° C.) and the fact that they are practically insoluble in organic solvents. However they can be converted to powders of a determined grain size and agglomerated by coalescence at a temperature lower than their crystalline melting point, under high pressure, for example between 100 and 3,000 kg./cm.$^2$, but this method is used only for forming simple shapes.

On the contrary the compositions based on prepolymers or intermediary precursors of heterocyclic polymers have a number of different uses before their conversion to heterocyclic polymers.

These compositions can be used for manufacturing shaped or moulded articles such as, for example, tubes, bulrushes, bars, blocks, filaments, powders, films and, after evaporation of the solvent, if any, converted to heterocyclic polymers whereby the material is given its final structure.

These compositions can be used as coating material. In this case the composition can be used as such or modified by addition of organic or mineral fillers, or of foaming agents and it is applied, according to conventional techniques, to a number of substrates. These substrates comprise copper, aluminum, brass, steel, titanium, boron, silver and other metals and metalloids in the form of sheets, fibers, threads, sieves, powders; mineral substances such as asbestos, glass, diamant, graphite, aluminum oxides, chromium, silicium and boron and silicium carbides in the form of plates, fibers, foams, powders; polymeric materials such as cellulose polymers, polyolefins, polyesters, polyamides, polyureas, polyimides, polyurethanes, polyquinoxalines, polybenzimidazoles, polybenzothiazoles, fluorinated polymers, in the form of sheets, fibers, foams, woven and unwoven fabrics, sieves; wood leather and other natural substances. Instead of using a fluid or semi-solid composition of prepolymer or polymer precursor (polyamide-acid or polyamide-ester) as coating agent laid on one or both pieces to stick together or of using a film of precursor polymer as intermediate adhesive layer, there can be used as well an adhesive sheet prepared by impregnating a paper or fabric with a composition of prepolymer or polymer precursor.

The invention will be further described more in detail in the following specific examples given by way of illustration and which are by no way limitative of the scope of the invention. In these examples the inherent viscosities, when indicated, are measured at 30° C. for a 0.5% by weight concentration in the mentioned solvent.

EXAMPLE 1

13.24 g. of tetraphenyl benzophenonetetracarboxylate and 4.54 g. of 4,4'-diamino-3-carbamoyl diphenyl are introduced into a flask of 50 ml., maintained under inert atmosphere.

The mixture is heated up to 250° C. for 1 hour. After cooling the prepolymer is withdrawn from the flask and crushed. Its inherent viscosity in N-methylpyrrolidone is 0.10. A sample of this prepolymer, heated under argon atmosphere for 1 hour at 300° C., 1 hour at 325° C. and 1 hour at 350° C. and thereafter under vacuum for 1 hour at 350° C. and 1 hour at 400° C., is converted to a heterocyclic polymer containing imide and iso-indoloquinazolinedione units wherein Ar is diphenyl and R is benzophenone.

The rest of the prepolymer is dissolved in 15 ml. of N-methylpyrrolidone and the solution is used for impregnating a glass fabric E, armouring 181, finish A–1100. After evaporation of the solvent at 150° C. for 1 hour, there is prepared a stratified material under a pressure of 15 kg./cm.$^2$ for 2 hours at 300° C. and 1 hour at 350° C. This material exhibits a strength to breaking under flexion of 60 kg./mm.$^2$ at 25° C. and 41 kg./mm.$^2$ at 300° C.

EXAMPLE 2

Under inert atmosphere 10 mmoles of dimethyl and diphenyl pyromellitate are admixed with 10 mmoles of 4-para-amino anthranilamide. The mixture is heated up to 250° C. for 1 hour and to 275° C. for a further hour. The obtained polymer has a viscosity of 0.092 dl./g. in dimethylacetamide. It is dissolved in a solvent and spread so as to form a film, on a glass plate. The polycondensation is completed by a treatment at 300° C. and 350° C. first under inert atmosphere and thereafter under a vacuum of 0.01 mm Hg. The obtained heterocyclic polymer is formed of imido, pyrroloisoindoloquinazolinedione and bis-quinazolinobenzodipyrrolotetrone units. Its threshold of thermal decomposition is about 400° C. under argon atmosphere.

EXAMPLE 3

1.51 g. of 2,4-diaminobenzamide and 20 ml. of dimethylacetamide are introduced in a flask of 50 ml. under inert atmosphere. The mixture is cooled down to about −20° C. and, under vigorous stirring, 3.47 g. of 2,5-diethoxycarbonyl terephthaloyl chloride are added thereto. The mixture is stirred over 30 min. at low temperature and two hours at room temperature. The intermediate polyamide-ester is separated by precipitation in water. After washing with methanol, acetone and ether, the polymer is dried at 40° C. for 48 hours under a vacuum of 0.01 mm. Hg. The inherent viscosity of this polymer is 0.47 dl./g. in dimethylacetamide. When heated above 200° the polyamide-ester is progressively converted to heterocyclic polymer containing imide, quinazolinobenzodipyrrolotetrone and diquinazolinobenzodipyrrolotetrone units. The threshold of thermal decomposition of this polymer is about 430° C. under argon atmosphere.

EXAMPLE 4

In a Waring mixer of 1 liter, there are introduced 300 ml. of iced deaerated water, 0.8 mole of sodium hydroxide and 0.2 mole of 4,4'-diamino-3-carbamoyl diphenylmethane dihydrochloride. To this mixture is very rapidly added a solution containing 0.2 mole of the isomeric dimethylesters-dichlorides of bis(3,4-dicarboxyphenyl) methane (obtained by treating the dianhydride with methanol at reflux, separating the isomer diesters and reacting the same with thionylchloride) in 50 ml. of methylenechloride. The mixture is stirred at a speed of 12,000 r.p.m. for 6 hours.

The intermediate polyamide-ester is separated by filtration, washed with water up to neutrality, with methanol and with ether then dried under vacuum for 48 h. at 35–45° C. It has an inherent viscosity of 0.78 dl./g. in dimethylacetamide.

A solution of this polymer in dimethylacetamide is prepared in such a manner as to have a 15% by weight content of solid material. This solution is spread on a glass plate in the form of a film of a 200μ thickness. The solvent is evaporated in a drying oven with forced ventilation for 5 hours at 50° C. and 1 hour at 80° C., then under vacuum for 2 hours at 120° C. The film is then pulled off from its support and converted to a heterocyclic polymer by heating for 2 hours at 200° and 1 hour at 300° C. The polymer is formed of imide and isoindoloquinazolinedione units, wherein Ar is diphenylmethane and R is diphenylmethane.

EXAMPLE 5

50 mmoles of the mixture of the diethyl esters of benzhydrol-3,3',4,4'-tetracarboxylic acid, 20 ml. of ethanol and 20 ml. of N-methylpyrrolidone are admixed in a flask of 100 ml. maintained under inert atmosphere.

When the resulting solution becomes clear, 50 mmoles of 2,5-diaminobenzamide are added thereto and the mixture is heated for 1 hour at 40°–50° C. The red-orange viscous solution is spread on glass fabric E, armour 181, with a finish treatment by γ-aminopropylthiethoxysilane (A-1100). The impregnated fabric is dried in a drying oven with forced ventilation at 120° C. for 1 hour.

The dry fabric is cut in 12 identical elements which are superimposed and placed in a hydraulic press heated to 200° C. The material is left 1 minute at this temperature under the contact pressure and then the pressure is adjusted to 15 kg./cm.$^2$ while the temperature is increased and maintained at 300° C. for 30 minutes and 350° C. for additional 30 minutes.

The obtained stratified material exhibits a flexion breaking stress of 70 kg./mm.$^2$ at 25° C. and 50 kg./mm.$^2$ at 300° C. The polymer forming the linkage between the glass fibers contains imide and isoindoloquinazolinedione units wherein Ar is benzene and R is benzhydrol.

EXAMPLE 6

15.4 g. (50 mmoles) of dianhydride of bis-(3,4-dicarboxyphenyl) methane and 100 g. of absolute ethanol are placed in a flask of 250 ml. maintained in inert atmosphere. The mixture is brought to reflux for 2 hours and cooled down to 40–50° C. 7.55 g. of 2,5-diaminobenzamide are then added thereto and the mixture is stirred at 40° C. up to complete dissolution. The solvent excess is then evaporated under reduced pressure and there is obtained a red-orange solid mixture which is crushed in a mortar. A layer of this mixture in a thickness of 0.5 to 1 mm. is placed on the bottom of a metallic rectangular mould which is placed in a dry oven with forced ventilation heated to 300° C. After a few minutes the mould becomes filled with an elastic and resistant expanded material of a red-orange colour. After a curing time of 15 minutes at 300° C. there is withdrawn a cellular material of an apparent density of 15 g./dm.$^3$.

The polymer forming this material contains imide and isoindoloquinazolinedione cycles wherein Ar is benzene and R is diphenylmethane. Its thermal decomposition threshold is close to 400° C. under inert atmosphere.

EXAMPLE 7

A glazing for electric wire is prepared in the following manner: 16.57 g. of isomeric ethyl diesters obtained by reacting the dianhydride of benzophenone-3,3',4,4'-tetracarboxylic acid with anhydrous ethanol, are dissolved in 10 g. of N-methylpyrrolidone in a flask of 100 ml. To the resulting solution is added another solution containing 9.73 g. of 4-p-aminophenoxyanthranilamide in 15 g. of a mixture of cresols. The resulting mixture, diluted with xylene, gives a glazing solution containing about 30% of solid materials.

After application on a metallic support, the glazing is dried and hardened at 250 and 300° C. The polymer formed during this thermal treatment comprises imide and isoindoloquinazolinedione cycles wherein Ar is diphenylether and R is benzophenone.

EXAMPLE 8

25 mmoles of 2,5-diaminobenzamide and 25 mmoles of the isomeric methyl diesters, obtained in the treatment of pyromellitic dianhydride with anhydrous methanol at reflux, are intimately admixed in a mortar. This mixture is placed in a flask maintained in inert atmosphere and polymerized at 150° C. for 1 hour and at 200° C. for 5 minutes. At the end of the reaction the prepolymer is withdrawn from the flask, crushed to a small orange powder which is compressed in a heating cylindrical mould. A homogeneous material is prepared by subjecting the powder to a pressure of 100 kg./cm.$^2$ and heating the mould at 300° C. for 15 minutes and at 350° C. for 10 minutes. The heterocyclic polymer forming this material contains imide, quinazolinobenzodipyrrolotetrone and diquinazolinobenzodipyrrolotetrone cycles. In the air its decomposition threshold is about 380° C.

EXAMPLE 9

A resinous composition is prepared with 4.14 g. of isomeric ethyl diesters of benzophenone-3,3',4,4'-tetracarboxylic acid, 4.16 g. of isomeric ethyl diesters of benzhydrol-3,3',4,4'-tetracarboxylic acid, 7 ml. of N-methylpyrrolidone, 7 ml. of ethanol and 3.02 g. of 2,5-diaminobenzamide, heated up at 50–60° C. for 45 minutes.

This composition is used as organic binding agent in the manufacture of a thermostable adhesive for stainless steel. The sticking of the metal pieces is effected under a pressure of 14 kg./cm.$^2$, for 15 minutes at 300° C. and 15 minutes at 350° C. The strength to shearing by overlapping is 205 kg./cm.$^2$ at 25° C., 150 kg./cm.$^2$ at 300° C. and 100 kg./cm.$^2$ at 350° C. The polymer contains recurring units which conform with the general formulae wherein Ar is benzene and R is benzophenone.

EXAMPLE 10

A 3-neck-flask of 1 ml. is equipped with a stirrer, an inert gas inlet and a funnel for addition of solids. 2.4327 g. of 4-m-amino-phenoxyanthranilamide and 35 g. of anhydrous dimethylacetamide are placed in the flask. The amine is quickly dissolved and 2.1813 g. of sublimated pyromellitic dianhydride are added stepwise under stirring. The reaction is exothermic and the rate of addition of the dianhydride is so regulated as to avoid that the temperature exceeds 30° C. The stirring is continued for one additional hour after the addition of the dianhydride is complete. A sample of the solution is withdrawn and diluted with dimethylacetamide to such an extent as to obtain a 0.5% concentration of polyamideacid. The inherent viscosity of the polymer is 2.05 dl./g.

The solution of polyamide-acid is cast on a glass plate which is placed in a drying oven scavenged with a nitrogen stream during a night at 40° C. Vacuum is then established in the oven and the film is heated up at 100° C. for one hour. The polymer film is then separated from its support, laid on a frame and progressively heated from 100° C. to 300° C. There is so obtained a supple red and cohesive film. The infra-red spectrum shows that the polymer is formed of imide, pyrroloisoindoloquinazolinedione and bis-quinazolinobenzodipyrrolotetrone recurring units.

EXAMPLE 11

A copolymer is prepared by dissolving 5.1867 g. of 4,4'-diamino-3-carbamoyl diphenylsulfide in 80 g. of N-methyl-pyrrolidone and adding stepwise under strong stirring a mixture of 2.1813 g. of pyromellitic dianhydride with 3.2223 g. of carbonyl-4,4'-diphthalic anhydride, 40 g. of N-methylpyrrolidone and 25 g. of toluene. The yellow-orange solution of copolyamide-acid is used for glazing a copper wire in 8 successive runs with a drying step of 30 minutes at 150° C. and 10 minutes at 250° C. between each two successive runs. The final curing of the glazing is effected at 300° C. for 1 hour. A study of said glazing shows that it contains imide, isoindoloquinazolinedione, pyrroloisoindoloquinazolinetetrone and bis-quinazolinobenzodipyrrolotetrone cycles.

EXAMPLE 12

A solution of copolyamide-acid is prepared by reacting at room temperature 8.7250 g. of pyromellitic dianhydride with a solution of 3.0234 g. of 2,4-diaminobenzamide and 3.0234 g. of 2,5-diaminobenzamide in 100 ml. of dimethylacetamide.

The resulting polymer has an inherent viscosity of 1.96 in dimethylacetamide.

A portion of this solution is spread on a glass plate by means of a scraper with an opening of 0.30 mm.

The resulting film is dried for 1 hour at 100° C. and the cyclisation is carried out by immersing said film for a night in a mixture containing 200 ml. of actetic anhydride and 200 ml. of pyridine. The film is then washed with methanol and dried for 1 hour at 150° C. and 5 minutes at 300° C.

Another portion of the solution is converted to a triethyl ammonium salt by addition of triethylamine, spread on a glass plate and converted by heating at 120° C. for 1 hour and a curing at 300° C. under vacuum for 30 minutes.

Still another portion of the solution is slowly added, in a Waring mixer operated at high running speed, to a large volume of tetrahydrofuran.

The copolyamide-acid, which precipitates, is separated by filtration, washed with methanol, with acetone, with ether and dried for 48 hours at 40° C. under vacuum. The copolyamide-acid powder is pressed in a cylindrical mould of stainless steel having an internal diameter of 25 mm. The powder is then compressed at a pressure of 500 kg./cm.² and the mould is placed between the plates of a heating press for effecting the conversion to heterocyclic polymer in 30 minutes at 300° C. and 30 minutes at 350° C. under a pressure of 200 kg./cm.². There is obtained a cylindrical disc of moulded polymer.

The last portion of the solution of copolyamide-acid is precipitated in a Waring mixer containing 200 ml. of toluene, 50 ml. of pyridine and 25 ml. of acetic anhydride. The obtained polymer is washed with acetone and ether, dried under vacuum at 150° C. for 30 minutes and at 250° C. for 5 minutes. Equal weights of this polymer and of silicium carbide are admixed in a rotary mixer with steel balls and a composite material is produced by coalescence at 400–500° C. under a pressure of 1,500 kg./cm.².

All the materials prepared in this example consist of a polymer which contains imide, pyrroloisoindoloquinazolinetetrone and diquinazolinobenzodipyrrolotetrone cycles.

EXAMPLE 13

2.573 g. of 4,4′-diamino-3-carbamoylbenzhydrol are dissolved, under inert atmosphere, into 25 ml. of m-cresol for industrial use. 3.7 g. of tri-n-butylamine and stepwise 3.2223 g. of carbonyl-4,4′-diphthalic anhydride are added thereto. After a final addition of 15 ml. of m-cresol, the flask in which the reaction takes place is immersed in a water-bath at 45–55° C. for 4 hours. The homogeneous yellow-orange solution is used as glazing solution. By curing the glaze at 300° C. the intermediate polymer is converted to heterocyclic polymer. This glaze exhibits a good stability at 300° C. in an oxidizing atmosphere. It contains recurring units which conform to the general formulae wherein Ar is benzhydrol and R is benzophenone.

EXAMPLE 14

3.2223 g. of carbonyl-4,4′-diphthalic anhydride are dissolved into 20 ml. of cresol and after cooling at 50–60° C. a mixture is added thereto which contains 2.5528 g. of 5-p-amino-benzoylanthranilamide, 0.75 g. of ammonium acetate and 15 ml. of cresol. When the addition is complete there is added 1 g. diethanolamine diacetate and the solution is used as glazing varnish. The hardening of the glaze is effected at 300° C. It contains recurring units conforming to the general formulae wherein Ar is diphenylmethane and R is benzophenone.

EXAMPLE 15

3.02 g. of 2,5-diaminobenzamide are dissolved into 20 ml. of deaerated water. 3.22 g. of carbonyl-4,4′-diphthalic anhydride in 20 ml. of pyridine are added under stirring.

There is obtained a viscous dark-yellow solution which is spread on a glass plate. The film is heated for a night at 50° C. and converted at 300° C. to heterocyclic polymer. The thermogravimetric analysis shows that this polymer starts decomposing at 380° C. in the air. It contains recurring units conforming to the general formulae wherein Ar is benzene and R is benzophenone.

EXAMPLE 16

1.51 g. of 2,4-diaminobenzamide are dissolved into 50 ml. of deaerated water and 2.1 g. of dianhydride of cyclopentane-3,3′4,4′-tetracarboxylic acid are suspended in this solution. 5 ml. of a 10 N ammonia solution are stepwise added thereto. The resulting solution is used for coating a glass gabric E–181, finish A–1100. The impregnated fabric is dried at 100° C. for one hour, cut into 12 identical elements which are superimposed and compressed in a hydraulic press at 15 kg./cm.², for 30 minutes at 300° C. and 30 minutes at 350° C.

The obtained material has a breaking stress in flexion of 48 kg./mm.². The polymer contained therein includes recurring units conforming with the general formula wherein Ar is benzene and R is cyclopentane.

EXAMPLES 17 TO 121

As specific examples of other polymers which have been prepared by the general and specific methods hereabove described, are to be mentioned the following polymers which contain recurrent units conforming with the following general formula:

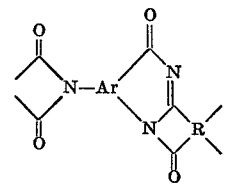

and/or

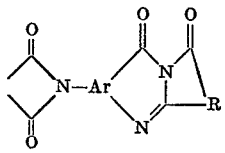

wherein radicals R and Ar are derived from the following hydrocarbons and heterocycles (the positions of substitution of R by carboxy groups, which lead to the formation of heterocycles and the positions of substitution of Ar by vicinal atoms or radicals —CO—, —N= and —N= are given in this order between brackets).

| Example serial number | Ar | R |
| --- | --- | --- |
| 17 | Benzene (1,2,4) | Benzophenone (3,3′,4,4′). |
| 18 | do | Benzhydrol (3,3′,4,4′). |
| 19 | do | Diphenylmethane 3,3′,4,4′). |
| 20 | do | Naphthalene(1,2,5,6). |
| 21 | do | Diphenyl(3,3′,4,4′). |
| 22 | do | Diphenylpropane(3,3′,4,4′). |
| 23 | do | Diphenylether(3,3′,4,4′). |
| 24 | do | Benzene(1,2,3,4). |
| 25 | do | Pyrazine(2,3,5,6). |
| 26 | do | Cyclopentane(1,2,3,4). |
| 27 | do | Azobenzene(3,3′,4,4′). |
| 28 | do | Azoxybenzene(3,3′,4,4′). |
| 29 | do | Benzamide(3,3′,4,4′). |
| 30 | do | Diphenylsulfide(3,3′,4,4′). |
| 31 | do | Diphenylsulfone(3,3′,4,4′). |
| 32 | Benzene(1,2,5) | Benzene(1,2,3,4). |
| 33 | do | Diphenyl(3,3′,4,4′). |
| 34 | do | Naphthalene(1,2,5,6). |
| 35 | do | Naphthalene(1,3,5,8). |
| 36 | do | Diphenylether(3,3′,4,4′). |
| 37 | do | Isopropylidnediphenyl (3,3′,4,4′). |
| 38 | do | Pyrazine(2,3,5,6). |
| 39 | do | Cyclopentane(1,2,3,4). |
| 40 | do | Azobenzene(3,3′,4,4′). |
| 41 | do | Azoxybenzene(3,3′,4,4′). |
| 42 | do | Benzanilide(3,3′,4,4′). |
| 43 | do | Benzo lbenzene(2,3,5,6). |
| 44 | do | Perylene(3,4,9,10). |
| 45 | do | Diphenylsulfone(3,3′,4,4′). |
| 46 | do | Benzophenone(2,2′,3,3′). |
| 47 | do | Thiophene(2,3,4,5). |
| 48 | do | Ethylene(1,1,2,2). |
| 49 | do | Butane(1,2,3,4). |
| 50 | Benzene(1,2,6) | Benzene(1,2,4,5). |
| 51 | do | Benzophenone(3,3′,4,4′). |
| 52 | do | Benzhydrol(3,3′,4,4′). |
| 53 | do | Diphenylmethane(3,3′,4,4′). |
| 54 | Naphthalene(1,2,8) | Naphthalene(1,2,5,6). |
| 55 | Pyrazine(3,2,5) | Pyrazine(2,3,5,6). |
| 56 | Pyrazine(2,3,5) | Pyrazine(2,3,5,6). |
| 57 | Benzophenone(4,3,4′) | Benzene(1,2,4,5). |
| 58 | do | Benzophenone (3,3′,4,4′). |
| 59 | do | Benzhydrol (4,3′,4,4′). |
| 60 | do | Diphenylmethane (3,3′,4,4′). |
| 61 | do | Diphenylether (3,3′,4,4′). |

| Example serial number | Ar | R |
|---|---|---|
| 62 | Benzophenone (3,4,4') | Benzene (1,2,4,5). |
| 63 | do | Benzhydrol (3,3',4,4'). |
| 64 | do | Diphenylmethane (3,3',4,4'). |
| 65 | Benzophenone (3,4,3') | Benzene (1,2,4,5). |
| 66 | do | Benzophenone (3,3',4,4'). |
| 67 | do | Benzhydrol (3,3',4,4'). |
| 68 | do | Diphenylmethane (3,3',4,4'). |
| 69 | do | Diphenylether (3,3',4,4'). |
| 70 | Benzophenone (4,3,3') | Benzene (1,2,4,5). |
| 71 | do | Benzophenone (3,3',4,4'). |
| 72 | do | Benzhydrol (3,4'4,4'). |
| 73 | do | Diphenylmethane (3,3',4,4'). |
| 74 | do | Diphenylether (3,3',4,4'). |
| 75 | Benzhydrol (3,4,4') | Benzene (1,2,4,5). |
| 76 | do | Benzophenone (3,3',4,4'). |
| 77 | Benzhydrol (3,4,3') | Benzene (1,2,4,5). |
| 78 | do | Benzophenone (3,3',4,4'). |
| 79 | Benzhydrol (4,3,4') | Benzene (1,2,4,5). |
| 80 | do | Benzophenone (3,3',4,4'). |
| 81 | Benzhydrol (4,3,3') | Benzene (1,2,4,5). |
| 82 | do | Benzophenone (3,3',4,4'). |
| 83 | Diphenylmethane (3,4,4') | Benzene (1,2,4,5). |
| 84 | do | Benzophenone (3,3',4,4'). |
| 85 | do | Diphenylmethane (3,3'4,4'). |
| 86 | Diphenylmethane (3,4,3') | Benzene (1,2,4,5). |
| 87 | do | Benzophenone (3,3',4,4'). |
| 88 | do | Benzhydrol (3,3',4,4'). |
| 89 | Diphenylmethane (4,3,4') | Benzene (1,2,4,5). |
| 90 | do | Benzophenone (3,3',4,4'). |
| 91 | do | Benzhydrol (3,3',4,4'). |
| 92 | Diphenylmethane (4,3,3') | Benzene (1,2,4,5). |
| 93 | do | Benzophenone (3,3',4,4'). |
| 94 | do | Benzhydrol (3,3',4,4'). |
| 95 | Diphenylether (3,4,4') | Benzene (1,2,4,5). |
| 96 | do | Benzophenone (3,3',4,4'). |
| 97 | do | Benzhydrol (3,3',4,4'). |
| 98 | do | Diphenylether (3,3',4,4'). |
| 99 | Diphenylether (3,4,3') | Benzene (1,2,4,5). |
| 100 | do | Benzophenone (3,3',4,4'). |
| 101 | do | Diphenylether (3,3',4,4'). |
| 102 | Diphenylether (4,3,3') | Benzene (1,2,4,5). |
| 103 | do | Benzophenone (3,3',4,4'). |
| 104 | do | Diphenylether (3,3',4,4'). |
| 105 | Diphenylether (4,3,4') | Benzene (1,2,4,5). |
| 106 | do | Benzophenone (3,3',4,4'). |
| 107 | do | Diphenylether (3,3',4,4'). |
| 108 | Benzanilide (3',4',3) | Benzanilide (3,3',4,4'). |
| 109 | do | Benzene (1,2,4,5). |
| 110 | Benzanilide (3',4',4) | Do. |
| 111 | Benzanilide (3',4',4) | Benzophenone (3,3',4,4'). |
| 112 | Benzanilide (4',3',3) | Benzene (1,2,4,5). |
| 113 | do | Benzophenone (3,3',4,4'). |
| 114 | Benzanilide (4',3',4) | Benzene (1,2,4,5). |
| 115 | do | Benzophenone (3,3',4,4'). |
| 116 | Diphenylsulfide (3,4,4') | Diphenylsulfide (3,3',4,4'). |
| 117 | Diphenylsulfone (3,4,4') | Diphenylsulfone (3,3',4,4'). |
| 118 | Diphenyl (3,4,4') | Benzene (1,2,4,5). |
| 119 | do | Benzophenone (3,3',4,4'). |
| 120 | do | Diphenyl (3,3',4,4'). |
| 121 | Diphenyldifluoromethane (3,4,4') | Diphenyldifluoromethane (3,3',4,4'). |

EXAMPLE 122

49.92 g. of ethyl diester of benzhydrol-3,3',4,4'-tetracarboxylic acid are reacted at 50° C. for 1 hour with 18.12 g. of 2,5-diaminobenzamide in a solvent composed of 40 ml. of N-methylpyrrolidone and 50 ml. of ethanol, in a flask of 100 ml. maintained under nitrogen atmosphere. At the end of the reaction 200 mg. of antioxidant of the phenolic type are added and the resin solution is used for preparing composite materials.

EXAMPLE 123

The resin of Example 122 is used for coating a glass fabric armour 181, treated with a finish by γ-amino-propyltriethoxysilane in such a manner that, after evaporation of the solvent the amount of resin retained on the glass fabric, be about 35 to 50% by weight. The impregnated fabric is placed in a drying oven with forced ventilation for 60 minutes at 120° C. The dry preimpregnated fabric then contains 37 to 38% by weight of resin. The proportion of volatile compounds, determined by heating a portion of the preimpregnated fabric at 250° C. for 10 minutes, is about 8%.

EXAMPLE 123A

A first half of the impregnated fabric of Example 123 is cut into 12 identical elements which are superimposed and placed between the plates of a hydraulic press heated to 200° C. The material is left for 1 minute at this temperature under the mere contact pressure. It is then subjected to a pressure of 15 kg./cm.$^2$ and heated for 30 minutes at 300° C. and 30 minutes at 350° C. The stratified material is withdrawn from the press when the temperature has fallen to 200° C. This material has a specific gravity of 1.92, a porosity close to 9% and has a resin content of about 20%. The breaking stress in flexion is 65 to 68 kg./mm.$^2$ at 25° C. and 43 to 47 kg./mm.$^2$ at 300° C.

After ageing at 300° C. in air, it still amounts to 36 to 39 kg./mm.$^2$ at 25° C. and 32 to 33 kg./mm.$^2$ after 250 hours, 34 to 36 kg./mm.$^2$ after 500 hours.

EXAMPLE 123B

With the second half of the preimpregnated fabric of Example 123, there is also prepared a stratified material with 12 layers, which is compressed in the following manner:

1 minute at 200° C. under contact pressure and 90 minutes at 250° C. under 15 kg./cm.$^2$. The resulting material is then annealed in nitrogen atmosphere at 200 to 350° C. with a rate of temperature increase of 10° C. per hour and a 6 hours stage at 350° C. The stratified material has a 25% resin content, a 12% porosity and a specific gravity of 1.82. Its breaking stress in flexion is 50 kg./mm.$^2$ at 25° C., 43 kg./mm.$^2$ at 300° C. After ageing for 250 hours at 300° C. in air these values become respectively 38 kg./mm.$^2$ at 25° C. and 33 kg./mm.$^2$ at 300° C.

In the two preceding examples the final material contains imide and isoindoloquinazoline-dione cycles wherein Ar is benzene and R is benzhydrol.

EXAMPLE 124

64.5 g. of carbonyl-4,4'-diphthalic anhydride are esterified in 500 ml. of absolute ethanol brought to reflux. There are added 4.2 g. of palladium deposited on carbon at 5% of Pd and the keto group is hydrogenated under a hydrogen pressure of 6 kg./cm.$^2$ for 3 hours at 25° C. There are further added in the hydrogenation reactor 36.2 g. of 5-nitroanthranilamide and 2 g. of Pd/C at 5% and hydrogenation of the nitro group is carried out under the same hydrogen pressure. At the end of the reaction there are introduced 60 ml. of N-methylpyrrolidone, 300 ml. of phenolic antioxidant and the mixture is heated to 50° C.–60° C. for 1 hour. The catalyst is removed by filtration and the ethanol excess evaporated until the resin-solvent mixture weighs 225 g.

EXAMPLE 124A

The resin solution of Example 124 is used for coating a glass fabric E–181, treated with finish A–1100. The fabric is then dried, cut into pieces and compressed as in Example 123A. The resulting material has a porosity of 12%, a specific gravity of 1.95 and a resin retention of 17%. Its breaking stress in flexion is 62–65 kg./mm.$^2$ at 25° C. and 44–48 kg./mm.$^2$ at 300° C. After ageing at 300° C. in air the following values are observed:

After 250 hours: 46–49 kg./mm.$^2$ at 25° C. and 44–48 kg./mm.$^2$ at 300° C.; after 500 hours: 38–41 kg./mm.$^2$ at 25° C. and 34–49 kg./mm.$^2$ at 300° C.; after 750 hours: 20–22 kg./mm.$^2$ at 25° C. and 19–20 kg./mm.$^2$ at 300° C.; after 1000 hours: 7–8 kg./mm.$^2$ at 25° C. and 8–9 kg./mm.$^2$ at 300° C.

EXAMPLE 124B

After impregnation with the resin of Example 124, the glass fabric E–181, A–1100 is immersed for one night in an aqueous solution of glycerol at 0.5% by volume and dried at 150° C. for 1 hour in a drying oven with forced ventilation. The stratified material is thereafter prepared as in Example 124A. The breaking stress in flexion is 85 kg./mm.$^2$ at 25° C. and 50 kg./mm.$^2$ at 300° C. After ageing in air at 300° C., the following values are observed: after 250 hours: 56–60 kg./mm.$^2$ at 25° C. and 40–44 kg./mm.$^2$ at 300° C.; after 500 hours: 38–42 kg./mm.$^2$ at 25° C. and 40–44 kg./mm.² at 300° C.; after 750 hours: 23–25 kg./mm.² at 25° C. and 24–25 kg./mm.² at 300° C.; after 1000 hours: 15–16 kg./mm.² at 25° C. and 16–17 kg./mm.² at 300° C.

EXAMPLE 125

The resin solution of Example 124 is admixed with aluminum powder (80 parts per 100 parts of dry resin), silica (2 parts per 100 parts of resin), arsenone (30 parts per 100 parts of resin) and this suspension is spread on a glass fabric E-112, finish A-1100. The coated fabric is dried at 90° C. for 1 hour and used for sticking test pieces of titanium alloy $TU_2$. Tests of longitudinal shearing at 300° C. after ageing at 300° C. give the following results: 0 hour: 136 bars; 500 hours: 114 bars; 1000 hours: 121 bars; 2000 hours: 110 bars; 3000 hours: 100 bars.

In the three preceding examples, the final material contains imide and iso-indoloquinazoline-dione cycles wherein Ar is benzene and R is benzophenone.

What we claim is:

1. A normally solid, agglomeratable polymer consisting essentially of recurrent units conforming with at least one of the general formulae:

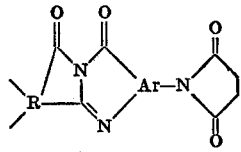

or

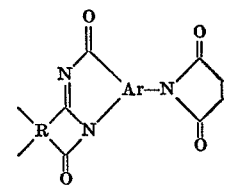

wherein Ar is selected from homocyclic and heterocyclic trivalent aromatic radicals, the three valences of which are linked to different carbon atoms, two of said valences being linked to adjacent carbon atoms, and R is a tetravalent organic radical containing at least two carbon atoms, and selected from the group consisting of aliphatic of 2–4 carbon atoms, cycloaliphatic of 5–6 carbon atoms, and aromatic of 4–24 carbon atoms and not more than 6 hetero atoms selected from the group consisting of oxygen, sulfur and nitrogen.

2. A polymer according to claim 1 wherein the radical Ar contains 2–6 fused rings.

3. A polymer according to claim 1 wherein the radical Ar contains 2–6 rings, one ring being linked to the other ring through a direct bond or one of the following groups:

–O–; –S–; –SO–; –SO₂–; –CO–; –CHOR₁– CF₂–; –NR₁–; COO–

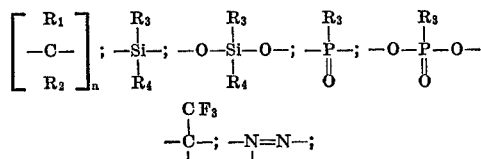

–N=N;— —CO—NR₁—; —R₁N—CO—NR₂—; —CO—O—Y—O—CO—

—O—CO—Y—CO—O—; —CO—R₁N—Y—NR₂—CO—

—R₁N—CO—Y—CO—NR₂— wherein $R_1$ and $R_2$ are selected from hydrogen atoms and hydrocarbon monovalent radicals, $R_3$ and $R_4$ are hydrocarbon monovalent radicals, Y is an alkylene, cycloalkylene or arylene radical and n is an integer.

4. A polymer according to claim 1 wherein R is a saturated aliphatic radical containing 2 to 4 carbon atoms.

5. A polymer according to claim 1 wherein R is an aromatic radical having four valences linked to carbon atoms which are two by two in ortho or peri position.

6. A prepolymer having an inherent viscosity of 0.05–5 dl./g. measured as a 0.5% by weight solution in N-methylpyrrolidone at 30° C., convertible to a polymer according to claim 1, said prepolymer consisting essentially of recurrent units of the general formula

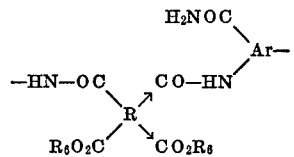

wherein $R_6$ radicals, identical to or different from each other, are monovalent hydrocarbon radicals and radicals R and Ar are defined as in claim 1.

7. A prepolymer having an inherent viscosity higher than about 0.1 dl./g. measured as a 0.5% weight solution in dimethylacetamide at 30° C., convertible to a polymer according to claim 1, said prepolymer consisting essentially of recurrent units of the general formula

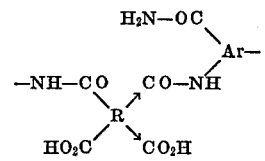

wherein radicals R and Ar are defined as in claim 1.

8. A normally solid, high molecular weight prepolymer, convertible to a polymer according to claim 1, said prepolymer consisting essentially of recurrent units of the general formula

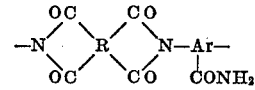

wherein radicals R and Ar are defined as in claim 1.

9. A process for manufacturing a polymer according to claim 1, comprising polymerizing at 0–500° C. at least one aromatic diaminoamide of the general formula

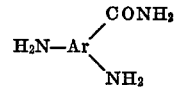

wherein Ar is defined as in claim 1, with at least one tetracarboxylic compound having the 4 carboxylic positions attached to R as defined by claim 1 and selected from the group consisting of tetraacids, tetraesters, dihaloformyldiesters, diester-diacids and dianhydrides, with the provision that neither the aromatic diaminoamide nor the tetracarboxylic compound is employed in more than 50% excess of the stoichiometric ratio.

10. A process according to claim 9, wherein the tetracarboxylic compound has the general formula

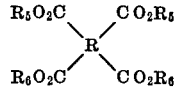

wherein $R_5$ and $R_6$ are hydrocarbon monovalent radicals.

11. A process according to claim 9, wherein the tetracarboxylic compound has the general formula

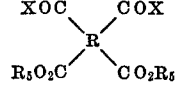

wherein $R_5$ is a hydrocarbon monovalent radical and X is a halogen atom.

12. A process according to claim 9 wherein the tetracarboxylic acid has the general formula

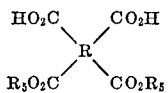

wherein $R_5$ is a hydrocarbon monovalent radical.

13. A process according to claim 9, wherein the tetracarboxylic compound has the general formula

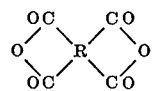

14. A process according to claim 9 wherein the tetracarboxylic compound has the general formula

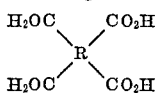

15. A prepolymer as defined by claim 7, said inherent viscosity being about from 0.3 to 5 dl./g.

16. A polymer as defined by claim 1 wherein Ar is a trivalent radical of benzene, diphenyl, diphenylmethane, benzhydrol, diphenylether, or diphenylsulfide.

17. A polymer as defined by claim 1 wherein R is a tetravalent radical of benzene, diphenylmethane, benzophenone, benzhydrol or cyclopentane.

18. A polymer as defined by claim 6 wherein R is a tetravalent radical of benzene, diphenylmethane, benzophenone, benzhydrol or cyclopentane.

References Cited

UNITED STATES PATENTS

| | | | |
|---|---|---|---|
| 3,461,096 | 8/1969 | Rabilloud et al. | 260—47 |
| 3,526,610 | 9/1970 | Bower | 260—65 |
| 3,533,997 | 10/1970 | Angelo | 260—47 |
| 3,541,054 | 11/1970 | Takekoshi | 260—78 |

WILLIAM H. SHORT, Primary Examiner

L. L. LEE, Assistant Examiner

U.S. Cl. X.R.

117—124 E, 126 AB, 126 GR, 132 B, 138.8 D, 138.8 E, 138.8 F, 138.8 N, 145, 161 P; 161—197, 227; 260—30.2, 30.6 R, 30.8 R, 32.6 N, 33.4 P, 65, 78 A, 78 TF